United States Patent [19]

Suzuki et al.

[11] 4,425,404
[45] Jan. 10, 1984

[54] MAGNETIC RECORDING MEDIUM

[75] Inventors: Takashi Suzuki, Takatsuki; Kunio Hibino, Hirakata; Mikio Murai; Takashi Fujita, both of Kawanishi, all of Japan

[73] Assignee: Matsushita Electric Industrial Co., Ltd., Osaka, Japan

[21] Appl. No.: 419,457

[22] Filed: Sep. 17, 1982

[30] Foreign Application Priority Data

| Apr. 30, 1982 | [JP] | Japan | 57-73605 |
| Apr. 30, 1982 | [JP] | Japan | 57-73606 |
| Apr. 30, 1982 | [JP] | Japan | 57-73607 |
| Apr. 30, 1982 | [JP] | Japan | 57-73608 |
| Aug. 27, 1982 | [JP] | Japan | 57-149672 |

[51] Int. Cl.³ .................... H01F 10/02; B32B 15/04
[52] U.S. Cl. ................................. 428/341; 428/457; 428/694; 428/695; 428/900
[58] Field of Search ............... 428/900, 694, 695, 219, 428/341

[56] References Cited

U.S. PATENT DOCUMENTS 4,171,399 10/1979 Allen et al. .................... 428/900

Primary Examiner—Bernard D. Pianalto
Attorney, Agent, or Firm—Burgess, Ryan & Wayne

[57] ABSTRACT

In a magnetic recording medium having an oxygen-containing thin ferromagnetic metal layer formed on a nonmagnetic substrate, at least one compound capable of suppressing the hydration of the ferromagnetic metal ions by acting thereon is located on or in the vicinity of the surface of the thin ferromagnetic metal layer. A lubricant may further be applied on the thin ferromagnetic metal layer.

10 Claims, 3 Drawing Figures

MAGNETIC RECORDING MEDIUM

BACKGROUND OF THE DISCLOSURE

1. Field of Invention

The present invention relates to a magnetic recording medium based on an electromagnetic conversion such as magnetic tapes, magnetic disks and so on.

2. Prior Art

A magnetic recording medium may be manufactured by depositing under vacuum conditions a thin ferromagnetic metal layer consisting mainly of Fe, Ni, Co or an alloy thereof on the surface of a base substrate composed of a non-magnetic material such as a plastic film, e.g. polyester, polyimide or the like, or an aluminum plate, a glass plate or the like, by means of deposition, ion plating, sputtering or other conventional techniques. The magnetic recording medium of this kind is suitable for high density recording such as recording of video signals. However, as the film thickness of the thin ferromagnetic metal layer is as small as 0.01 to 0.5 μm, corrosion is apt to occur on the surface of the magnetic recording medium in instances where it is exposed to highly moist atmospheres, particularly to atmospheres in which condensation is formed due to large variations in temperature. When corrosion has progressed to a certain extent, it has an effect on electromagnetic conversion performance and degrades working performance such as head touch, abrasion resistance and so on. Attempts have been made to control corrosion with an anti-corrosive agent; known anti-corrosive agents for a bulk metal such as Fe, Co, Ni or the like may be so employed.

Examples of such known anti-corrosive agents include a basic nitrogen compound such as an alkylamine or an aliphatic acid salt of an alkylamine; a phosphorus compound such as an alkyl phosphate, an alkyl thiophosphate, an alkyl hydrogen phosphoric acid ester or a phosphorus ester; a sulphonate such as petroleum sulphonate, mahogany acid sulphonate or dinonyl naphthalene sulphonate; a particular ester such as sorbitan monooleate or methyl ester of an organic acid; a particular carboxylic acid derivative such as a metallic soap of petroleum acid or of abietic acid or α-mercaptostearic acid; or a so-called volatile corrosion inhibitor such as dicyclohexylammonium nitrite, diisopropylammonium nitrite or cyclohexylamine carbamate. These bulk metal anti-corrosive agents are disclosed, for example, in "Manual of Metal Surface Technology", New Edition, Edited by Metal Surface Technology Association (1963; Publisher, Nikkan Kogyo Shimbunsha), pp. 1417 to 1439.

An oxygen-containing thin ferromagnetic metal layer formed by introducing a minute amount of oxygen gas into the vacuum system during the formation of the thin ferromagnetic metal layer is higher in coercive force than a layer containing no oxygen. Although the oxygen-containing thin ferromagnetic layer also provides an improved adhesive strength between the thin layer and the substrate and a greatly enhanced corrosion resistance, its corrosion resistance under severe atmospheres still is not satisfactory. Accordingly, such an anti-corrosive agent has been denounced as being inapplicable under severe conditions. It has now been found that anti-corrosive agents described hereinabove as being suitable for a thin ferromagnetic metal layer containing no oxygen, do not in fact impart a very good corrosion resistance to an oxygen-containing thin ferromagnetic metal layer, and in some cases they tend to accelerate corrosion.

The conventional bulk metal anti-corrosive agents are such that they act directly on the metal and stabilize the state of the metal surface. This phenomenon is described, for example, in "Rust preventing management" by Seiichi Fujii, 1978, Vol. 12, pp. 11 to 17. It is considered, however, that the surface of an oxygen-containing thin ferromagnetic metal layer is covered with an oxide layer of the ferromagnetic metal, and that when such a known anti-corrosive agent is used it penetrates through the oxide layer to act on the metal present therein, whereby the oxide layer cannot fulfil its purpose as a protective layer.

Therefore, it is now desired to use a new anti-corrosive agent for an oxygen-containing thin ferromagnetic metal layer, which is different from the conventional anti-corrosive agents.

A magnetic recording medium of the thin ferromagnetic metal layer type as described hereinabove provides an extremely high recording density compared with the conventional coated-type magnetic recording medium. This high-density recording also requires a spacing loss to be minimized and narrowing the gap of a magnetic head and at the same time flattening the surface of the magnetic recording medium. The spacing loss is required to be below 500 Å, and preferably below 300 Å. Although head touch and travel performance can be improved to a considerable extent by controlling the surface condition of the magnetic recording medium, it is essentially impossible to significantly decrease the contact area between the head and the medium, and to prevent an increase in a coefficient of friction.

The anti-corrosive agents to be used in the present invention contain a compound having a particular polar group bindable to a ferromagnetic metal ion. These anti-corrosive agents, by being adsorbed onto the thin ferromagnetic metal layer prevent rust from forming, but do not produce a very good effect in improving head touch and travel performance. It has been found that they rather have the drawback that they clog the gap of the head when applied in excess.

Although application of various lubricants has been proposed in order to reduce a coefficient of friction between the head and the magnetic recording medium, such lubricants excluding special ones do not exhibit the effect of rust resistance and in some cases they rather become a rust accelerating agent.

SUMMARY OF THE INVENTION

Object of the Invention

It is an object of the present invention to provide a magnetic recording medium having an oxygen-containing thin ferromagnetic metal layer as a magnetic layer, having an enhanced corrosion resistance and at the same time having an improved travel performance and durability.

Constitution of the Invention

The present invention relates to a magnetic recording medium having an oxygen-containing thin ferromagnetic metal layer formed on a non-magnetic substrate, characterized in that a compound capable of suppressing hydration of the ferromagnetic metal ions by acting thereon is in the vicinity of said thin ferromagnetic metal layer, and also relates to a magnetic recording medium produced by further applying a lubricant to such a magnetic recording medium.

DETAILED DESCRIPTION OF THE INVENTION

The non-magnetic substrate may comprise a film or sheet of a plastic such as a polyester, polyamide, polyimide or the like; a metallic plate consisting of aluminum, stainless steel or the like; or a ceramic plate or glass plate or the like. Since the surface configuration of the magnetic recording medium of the thin ferromagnetic metal layer type is largely dependent upon the surface configuration of the substrate, due to the thin metal layer formed thereon being usually as thin as 0.1 to 0.5 μm, it is particularly preferred to use a substrate produced so as to control its surface condition to a desired fineness, as disclosed in Japanese Patent Openings No. 116,115/1978, No. 16,937/1981 and No. 37,719/1982.

Such oxygen-containing thin ferromagnetic metal layers are disclosed in, for example, Japanese Patent Publication No. 23,208/1981 and Japanese Patent Openings No. 42,010/1978, No. 15,014/1981 and No. 37,719/1982.

The thin ferromagnetic layer which is obtained by carrying out continuous oblique deposition in a vacuum into which oxygen is introduced, is composed of an aggregate of fine, prismatic crystals. Each of the prismatic crystals is covered with an oxide layer of the ferromagnetic metal constituting the crystal. This oxide layer is at maximum as thin as 100 to 200 Å and there are many defects on its surface, such as crystal-structure defects or those derived from hydrates. In such defects, ferromagnetic metal ions, oxide ions and/or hydroxide ions are easily hydrated to become hydrated oxides of the ferromagnetic metal, that is, rust.

As a result of studies and review, it has been concluded that a compound capable of acting on the ionized ferromagnetic metal, that is, on its ions, its oxide ions and/or its hydroxide ions, and then of controlling the hydration of these ions, may be employed as a most appropriate anti-corrosive agent. Such a compound will be referred to merely as an "anti-corrosive agent" herein unless otherwise stated.

The anti-corrosive agents to be employed herein may be, for example, a dihydric phenol, a diaryl ketone, an alkylphenol, a naphthol, a quinone, a nitroso compound, an oxime compound and so on. These compounds will be described in more detail hereinbelow.

The dihydric phenols may include, for example, a true phenol such as hydroquinone, resorcin or catechol, or its alkylamino-, nitro-, nitroso- or halogen-substitution such as 2-methylhydroquinone, 4-methylresorcinol, 5-methylresorcinol, 4-methylpyrocatechol, 2,5-dimethylhydroquinone, 4,6-dimethylresorcinol, 2,5-dimethylresorcinol, 2-isopropyl-5-methylhydroquinone, 2-tert.-butylhydroquinone, 2,5-di-tert.-butylhydroquinone, 4-tert.-butylcatechol, 2-aminoresorcinol, 2-nitroresorcinol, 2,5-dichlorohydroquinone or the like.

The diaryl ketones may include, for example, benzophenone or a derivative thereof such as an alkyl substituted derivative including 4-methylbenzophenone, 3-methylbenzophenone, 3,4-dimethylbenzophenone, 4,4'-dimethylbenzophenone, 3,4'-dimethylbenzophenone, 4-ethylbenzophenone or the like; a hydroxybenzophenone including 4-hydroxybenzophenone, 4,4'-dihydroxybenzophenone, 2,3,4-trihydroxybenzophenone, 2,4-dihydroxybenzophenone, 2,2',5,6'-tetrahydroxybenzophenone, 2,3',4,4',6-pentahydroxybenzophenone or the like; an aminobenzophenone including 4-aminobenzophenone, 4,4'-diaminobenzophenone or the like; or a benzophenone having two or more substituents including 4-methoxy-2-hydroxybenzophenone, 2,2'-dihydroxy-4,4'dimethoxybenzophenone, 2,6-dihydroxy-4-methoxybenzophenone or the like.

The alkylphenols may include, for example, an alkyl substitution of a monohydric phenol, such as o-cresol, m-cresol, p-cresol, o-ethylphenol, m-ethylphenol, p-ethylphenol, 2,3-dimethylphenol, 2,5-dimethylphenol, 2,6-dimethylphenol, 3,4-dimethylphenol, 3,5-dimethylphenol, 2,4,6-trimethylphenol, 2,4,5-trimethylphenol, 5-isopropyl-2-methylphenol, 2-isopropyl-5-methylphenol, p-tert.-butyl-phenol, 2,6-di-tert.-butyl-p-cresol, 4,4'-methylenebis-2,6-di-tert.-butylphenol, 2,6-dimethyl-4-tert.-butylphenol, 2-tert.-amyl-4-methylphenol, 2-methyl-4,6-di-tert.-butylphenol, 2,4,6-tri-tert.-butylphenol or the like.

The naphthols may include, for example, a true naphthol such as α-naphthol, β-naphthol, 1,2-naphthalenediol, 1,4,5-naphthalenetriol, 1,2,5,8-naphthalenetetraol or the like, or a nitro-, nitroso-, amino- or halogen-substituted naphthol such as 1-chloro-2-naphthol, 2,4-dichloro-1-naphthol, 1-nitro-2-naphthol, 1,6-dinitro-2-naphthol, 1-nitroso-2-naphthol, 2-nitroso-1-naphthol, 1-amino-2-naphthol or the like.

The quinones may include, for example, an unsubstituted quinone such as p-benzoquinone, o-benzoquinone, 1,2-naphthoquinone, 1,4-naphthoquinone, 2,6-naphthoquinone, anthraquinone, 9,10-phenanthrenequinone, diphenoquinone or the like; a methylquinone such as methyl-p-benzoquinone, 2,3-dimethyl-p-benzoquinone, 2-methyl-1,4-naphthoquinone, 2-methylanthraquinone or the like, a hydroxyquinone such as 2,5-dihydroxy-p-benzoquinone, tetrahydroxy-p-benzoquinone, 5-hydroxy-1,4-naphthoquinone, 2,3-dihydroxy-1,4-naphthoquinone, 5,8-dihydroxy-1,4-naphthoquinone, 2-hydroxyanthraquinone, 1,2-dihydroxyanthraquinone, 1,2,3-trihydroxyanthraquinone, 1,2,4-trihydroxyanthraquinone, 1,2,5-trihydroxyanthraquinone, 1,2,6-trihydroxyanthraquinone, 1,2,7-trihydroxyanthraquinone or the like; an aminoquinone such as 2-aminoanthraquinone, 1,2-diaminoanthraquinone or the like; a nitroquinone such as 1-nitroanthraquinone, 1,5-dinitroanthraquinone or the like; a halogenoquinone such as 2,6-dichloro-p-benzoquinone, tetrachloro-p-benzoquinone, tetrafluoro-p-benzoquinone or the like; or a quinone having two or more substituents such as 2,5-dichloro-3,6-dihydroxy-p-benzoquinone, 1-methyl-2-hydroxy-1,4-naphthoquinone or the like.

The nitroso compound may be an organic compound having both a hydroxy group and a nitroso group, such as one of the nitrosophenol series and the nitrosonaphthol series. Specifically, it may be selected from 1-nitroso-2-naphthol, 2-nitroso-1-naphthol, 1-nitroso-2-naphthol-3,6-disulphonic acid sodium salt (nitroso R salt), 4-nitroso-2-methoxy-1-phenol, 4-nitroso-2-ethoxy-1-phenol, 4-nitrosocarvacrol, 6-nitroso-o-cresol, 4-nitroso-m-cresol, o-nitrosophenol, 2-nitrosoresorcin, 4-nitrosoresorcin, 2-nitrosoresorcin monomethylether, N-nitrosophenyl hydroxylamine ammonium salt (cupferron), p-nitrosophenol, 2-nitroso-1-naphthol-4-sulphonic acid, 5-nitroso-8-quinolinol or the like.

The oxime compounds may include, for example, benzyloxime, glyoxime, benzaldoxime, benzamidoxime, α-benzoinoxime, acetophenone oxime, benzophenone oxime, dimethylglyoxime, salicylaldoxime or the like.

These anti-corrosive agents produce their effects when they are present at least on the surface of the thin ferromagnetic layer and preferably within the layer or at the interface thereof with the substrate on which the thin ferromagnetic layer is formed. The amount of the anti-corrosive agent ranges preferably from about 0.5 to 500 mg per square meter of the magnetic recording medium. The anti-corrosive agent may be applied to the thin ferromagnetic metal layer by, for example, the coating technique by which the anti-corrosive agent to be used is admixed with a substance such as a polymer substance having a film forming ability, and the resulting mixture is coated thereon after dilution, if necessary, with a suitable solvent; by a technique in which a vapor of the anti-corrosive agent is applied thereto; by a transfer technique in which the anti-corrosive agent is applied to the rear surface of the magnetic recording medium and is transferred to the front surface thereof when the tape is wound in a roll; and by any other conventional technique.

It is also possible to apply a thin ferromagnetic metal layer to a nonmagnetic substrate containing an anticorrosive agent, where the anti-corrosive agent is introduced into the side surface of the substrate with which it has been brought into contact.

The substrate containing the anti-corrosive agent may be prepared by forming numerous minute pores at least on the surface of the substrate by means of etching or the like, and by permitting the anti-corrosive agent to enter the pores. Plastic substrates may be prepared, for example, by adding the anti-corrosive agent to a substrate raw material or to an agent for providing a surface shape when coatings are applied, or by diffusing the anti-corrosive agent through the substrate by means of immersion thereof in an anti-corrosive agent solution. The anti-corrosive agent may be present homogeneously within a nonmagnetic substrate, or in the vicinity of a surface thereof in a localized manner. It may also be segregated in a finely divided form. It is desirable that the anti-corrosive agent be present on at least one of the substrate surfaces on which the magnetic layer is formed.

The amount of anti-corrosive agent in or on the nonmagnetic substrate may be in the range of 0.001 to 10% by weight, and preferably 0.01 to 1% by weight at least in the vicinity of the surface on which the magnetic layer is formed, to within a depth of about 1,000 Å from the surface. The amount of anti-corrosive agent present deeper within the substrate may be equal to or smaller than that in the vicinity of the surface.

It is further noted that the anti-corrosive agents as described hereinabove may be employed singly or in combination with each other. In order to further enhance the effect of the anti-corrosive agent on the thin ferromagnetic metal layer, it is possible to subject the thin ferromagnetic metal layer to heat treatment after the application of the anti-corrosive agent. If an excess of the anti-corrosive agent is adhered to the surface of the thin ferromagnetic metal layer, an excess of the anti-corrosive agent may be removed by washing the surface of the thin layer with a solvent capable of selectively dissolving the anti-corrosive agent. The anti-corrosive agent may usually be adsorbed at particular sites of the surface of the thin ferromagnetic metal layer by means of chemical adsorption or in such a manner similar thereto that it may not be removed merely by washing with a solvent. This may be assumed from the fact that a sufficient degree of anti-corrosion is achieved even after washing with the solvent; it may also be determined by measurement of the chemical shift by means of X-ray photoelectric spectrometry (ESCA).

As described under the conventional examples, the anti-corrosive agent to be used in accordance with the present invention does not provide sufficient improvement in a coefficient of friction between the magnetic recording medium and a magnetic head or a rotary cylinder or the like, so that the additional use of a lubricant is necessary if high lubrication of the magnetic recording medium is required. Procedures for providing further lubrication of the magnetic recording medium are as follows:

(1) Forming a lubricant layer on the external surface of a thin ferromagnetic metal layer at or in the vicinity of the interface thereof with the anti-corrosive agent; and (2) Forming a thin ferromagnetic metal layer on one of the surfaces of a flexible, elongated, nonmagnetic substrate in such a manner that the anti-corrosive agent may be introduced on or in the vicinity of the surface of the thin ferromagnetic metal layer, and forming a lubricant layer or a lubricant-containing resinous layer on the other substrate surface.

Figure 1:
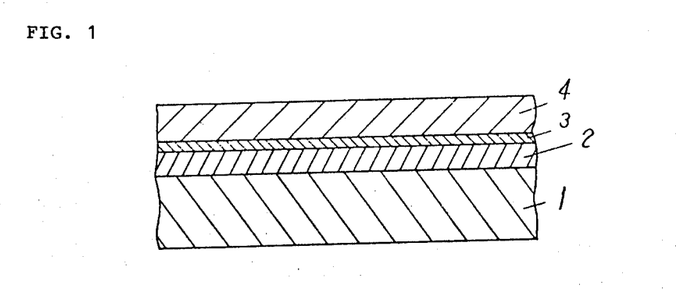
FIGS. 1, 2 and 3 are cross-sectional views illustrating the respective embodiments of the magnetic recording medium according to the present invention.
Figure 2:
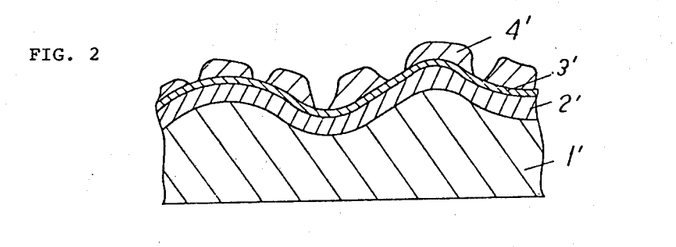
Figure 3:
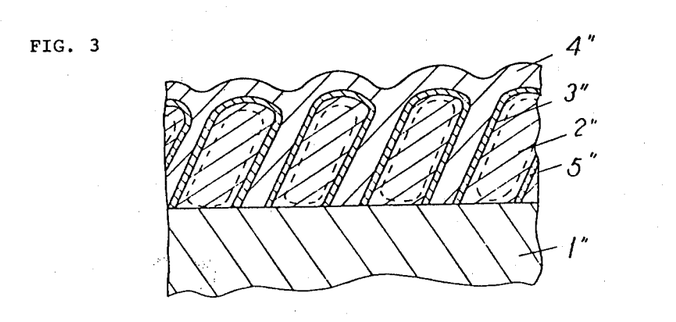

FIGS. 1 through 3 illustrate respective embodiments of the magnetic recording medium formed according to procedure 1 above. In the drawings, reference numerals 1, 1' and 1" denote substrates; 2, 2' and 2", thin ferromagnetic metal layers; 3, 3' and 3", adsorbed layers of the anti-corrosive agent; and 4, 4', and 4", lubricant layers respectively. Reference numeral 5" is an oxide layer of the ferromagnetic metal covering the surface of the oxygen-containing thin ferromagnetic metal layer. In the embodiment as shown in FIG. 1, the lubricant layer 4 is adsorbed homogeneously onto the anti-corrosive layer 3. In the embodiment as shown in FIG. 2, the lubricant layer 4' is aggregated and adsorbed onto the anti-corrosive agent 3' in an island form. FIG. 3 is a view illustrating more microscopically than in FIGS. 1 and 2, which is provided by obliquely depositing a ferromagnetic metal in the presence of a minute amount of oxygen. In this embodiment, the layer 3" of the anti-corrosive agent is adsorbed onto the thin ferromagnetic metal layer 2" which is composed of a prismatic crystal structure covered at its surface with the oxide layer and further provided at its surface with the lubricant layer 4". As is apparent from these embodiments, the magnetic recording medium according to the present invention is constructed such that the thin ferromagnetic metal layer is covered with the anti-corrosive agent layer so that a favorable corrosion resistance is achieved, and a coefficient of friction with a magnetic head is reduced, due to the aid of the lubricant layer present on the surface of the magnetic recording medium, enhancing an abrasion resistance of the surface of the magnetic recording medium upon repeated travel. It is surprisingly found that the adsorption of the lubricant onto the thin ferromagnetic metal layer through the anti-corrosive agent layer is more stable than in the case where the lubricant is adsorbed directly onto the thin ferromagnetic metal layer.

The lubricant layer may be composed in a manner as described hereinbelow. It may contain an antistatic agent and/or a fungicide as required.

As the lubricant there may be employed an aliphatic acid, an aliphatic acid ester, an aliphatic acid amide, a metallic soap, an aliphatic alcohol, a paraffin, a silicone and a fluorine-type surface active agent. Among these lubricants, some aliphatic acids, fluorine-type surface active agents and so on can impart a corrosion resistance to a thin ferromagnetic metal layer and their effect is further enchanced by the aid of the anti-corrosive agent layer interposed therebetween as compared to the use of such a lubricant alone. It is accordingly particularly appropriate to employ such a lubricant for the present invention.

The aliphatic acid may be, for example, an acid having from 12 to 22 carbon atoms such as lauric acid, myristic acid, palmitic acid, stearic acid, behenic acid, oleic acid, linoleic acid, linolenic acid or the like.

The aliphatic acid ester may be, for example, ethyl stearate, butyl stearate, amyl stearate, stearic acid monoglyceride, palmitic acid monoglyceride, oleic acid monoglyceride, pentaerythritol tetrastearate or the like.

The aliphatic acid amide may be, for example, caproic acid amide, caprylic acid amide, lauric acid amide, palmitic acid amide, stearic acid amide, behenic acid amide, oleic acid amide, linoleic acid amide, methylenebisstearic acid amide, ethylenebisstearic acid amide or the like.

The metallic soap may comprise a salt of an acid such as lauric acid, myristic acid, palmitic acid, stearic acid, behenic acid, oleic acid, linoleic acid, linolenic acid or the like with a metal such as zinc, lead, nickel, cobalt, iron, aluminum, magnesium, strontium, copper or the like; or a salt of a sulphonate of an acid such as lauric acid, palmitic acid, myristic acid, stearic acid, behenic acid, oleic acid, linoleic acid, linolenic acid or the like with one of the above-described metals.

The aliphatic alcohol may be, for example, cetyl alcohol, stearyl alcohol or the like.

The paraffin may be, for example, a saturated hydrocarbon such as n-octadecane, n-nonadecane, n-tridecane, n-docosane, n-dotriacontane or the like.

The silicone may be, for example, a polysiloxane having its hydrogen or hydrogens partially substituted by an alkyl group or a phenyl group, and those modified with an aliphatic acid, an aliphatic alcohol, an acid amide or the like.

The fluorine-type surface active agent may comprise a salt of an acid such as perfluoroalkylcarboxylic acid or perfluoroalkylsulfonic acid with a metal such as sodium, potassium, magnesium, zinc, aluminum, iron, cobalt, nickel or the like; perfluoroalkyl phosphoric ester; perfluoroalkyl betaine; perfluoroalkyltrimethyl ammonium salt; perfluoroethylene oxide; perfluoroalkyl aliphatic ester; or the like.

These lubricants may be employed singly or in combination with each other. The lubricant layer may be heat-treated after the formation thereof in order to stabilize the lubricant layer.

The thickness of the lubricant layer should generally be less than 500 Å, and preferably less than 200 Å. In instances where the thin ferromagnetic metal layer is a prismatic crystal structure formed by means of oblique deposition or the like, the lubricant layer may be formed over a whole area of the prismatic crystals as shown in FIG. 3. It is also possible to produce the effect which is the object of the present invention by exposing the lubricant on the surface in a localized manner.

In the above-described embodiments, it is possible to add the anti-corrosive agent to the lubricant layer or to mix the former with the lubricant. Improved anti-corrosion may be obtained by introducing a slightly excessive amount of the anti-corrosive agent onto the surface of the thin ferromagnetic metal layer.

The magnetic recording medium as embodied in item 2 above will now be described in more detail.

The formation of the lubricant layer may comprise allowing the lubricant or a mixture thereof to adhere directly to the surface of a nonmagnetic substrate or to a back coating formed on the nonmagnetic substrate. Specifically, a dilution of the lubricant with a solvent may be applied in a thin coating or a vapor of the lubricant may be applied to the surface of the non-magnetic substrate or to the back coating. In this case, it is possible to add to the lubricant an antistatic agent, a fungicide or the anti-corrosive agent to be adsorbed into the magnetic surface. The amount of the lubricant to be adhered may be generally in the range of 0.5 to 500 $mg/m^2$, and preferably 5 to 200 $mg/m^2$ of the magnetic recording medium.

Other procedures for forming the lubricant layer are to incorporate the lubricant in the back coating and then to convert the lubricant into the lubricant layer useful for the magnetic recording medium according to the present invention. Specifically, the back coating may be formed by coating a solution or a dispersion of fine powders in a solution of a resin on the surface of a nonmagnetic substrate, said resin being selected from the group including those of vinyl chloride types, ester types, urethane types, epoxy types or the like. The lubricant to be used in accordance with the present invention may include, for example, fine powders of carbon black, graphite, molybdenum disulfide, calcium carbonate, silica, alumina or the like.

The thickness of the back coating may be in the range of 0.01 to 0.5 $\mu m$. The amount of the lubricant contained in the coating may be appropriately within the range of 0.1 to 50% of the volume of the coating. Added to this back coating may be an antistatic agent, a fungicide or the anti-corrosive agent to be adsorbed onto the surface of the magnetic layer.

In instances where the anti-corrosive agent is added to the lubricant layer, the anti-corrosive agent is transferred to the magnetic surface together with the lubricant when the magnetic recording medium is wound in a roll, thereby preventing the abrasion of the surface of the magnetic layer in practical running and the deterioration of the corrosion resistance on portions of the magnetic layers on which damage such as cracking occurs. For similar reasons, a slightly excessive amount of the anti-corrosive agent may be present on the anti-corrosive agent layer provided on the magnetic layer surface. When the amount of the anti-corrosive agent present on the anti-corrosive agent layer is too much, it may cause clogging of a magnetic head. The amount of such anti-corrosive agent may be at maximum 100 mg, and preferably from 5 to 50 $mg/m^2$ of the magnetic recording medium. Within this limit, the transfer of the lubricant to the magnetic surface may be performed without clogging. This is one of the effects achieved by the present invention.

In order to complete the transfer of the lubricant to the magnetic surface, it is possible, if necessary, to subject the magnetic recording medium in a roll form to heat treatment immediately after manufacture. The heat-treatment may be performed at 30° to 60° C. for 1 to 50 hours.

EXAMPLE 1

A polyester film having a thickness of 10 μm was run along a cylindrical can in a vacuum of $5 \times 10^{-5}$ Torr into which oxygen was introduced at the rate of 0.3 l/min. In this vacuum device, a CoNi alloy (having an Ni content of 20% by weight) which was fused by electron beam heating was obliquely deposited on the polyester film. The alloy of an incident angle of 30° or less was cut off. Thus, there was formed an oxygen-containing CoNi thin ferromagnetic metal layer having a thickness of 1,000 Å. This will be referred to as Sample A.

Another sample was prepared in substantially the same manner with the exception that the CoNi thin ferromagnetic metal layer was formed in a vacuum of $5 \times 10^{-6}$ Torr into which no oxygen was introduced. This will be referred to as Sample B.

From measurement of the amount of oxygen in the coating by means of the Auger electron spectrometry analysis, it was found that the average amount of oxygen in the coating of Sample A was 10% as an atomic ratio of oxygen to the sum of Co and Ni atoms (Oxygen/(Co+Ni)×100), whereas the average amount of oxygen in the coating of Sample B was less than 1%.

For observing the occurrence of rust, samples were prepared by coating a solution of various anti-corrosive agents in water, ethylalcohol, acetone, toluene or the like so as to form a coating of 10 mg/m² to 100 mg/m². The occurrence of rust was measured periodically in an atmosphere in which the temperature was maintained at 50° C. and the moisture at 90% relative humidity. The results are shown in Tables 1 through 6 which follow.

As will be apparent from the results shown in the following tables, the anti-corrosive agents to be used in accordance with the present invention have significant anti-corrosive effects on oxygen-containing CoNi thin layers. Particularly favorable effects were obtained on the CoNi thin layers having an oxygen content in the range of 3 to 45% and an Ni content in the range of 10 to 55% by weight. Analogous results were obtained on Co thin layers, Fe-Ni thin layers, Fe-Co thin layers and so on.

TABLE 1

| Examples No. | Anti-corrosive agents | | Rust occurrence Sample A | Rust occurrence Sample B |
|---|---|---|---|---|
| 1 | hydroquinone | | No rust in 5 weeks | Rust occurred within 1 week |
| 2 | resorcin | | No rust in 5 weeks | Rust occurred within 1 week |
| 3 | catechol | | No rust in 5 weeks | Rust occurred within 1 week |
| 4 | 2-methylhydroquinone | | No rust in 5 weeks | Rust occurred within 1 week |
| 5 | 4-methylresorcinol | | No rust in 5 weeks | Rust occurred within 1 week |
| 6 | 5-methylresorcinol | | No rust in 5 weeks | Rust occurred within 1 week |
| 7 | 4-methylpyrocatechol | | No rust in 5 weeks | Rust occurred within 1 week |
| 8 | 2,5-dimethylhydroquinone | | No rust in 5 weeks | Rust occurred within 1 week |
| 9 | 4,6-dimethylresorcinol | | No rust in 5 weeks | Rust occurred within 1 week |
| 10 | 2,5-dimethylresorcinol | | No rust in 5 weeks | Rust occurred within 1 week |
| 11 | 2-isopropyl-5-methyl-hydroquinone | | Rust occurred after 5 weeks | Rust occurred within 1 week |
| 12 | 2-tert.-butylhydroquinone | | Rust occurred after 5 weeks | Rust occurred within 1 week |
| 13 | 2,5-di-tert.-butylhydroquinone | | Rust occurred after 5 weeks | Rust occurred within 1 week |
| 14 | 4-tert.-butylcatechol | | No rust in 5 weeks | Rust occurred within 1 week |
| 15 | 2-aminoresorcinol | | No rust in 5 weeks | Rust occurred within 1 week |
| 16 | 2-nitroresorcinol | | Rust occurred after 5 weeks | Rust occurred within 1 week |
| 17 | 2,5-dichlorohydroquinone | | Rust occurred after 5 weeks | Rust occurred within 1 week |
| 18 | hydroquinone 2-tert.-butylhydroquinone | 50% 50% | No rust in 5 weeks | Rust occurred within 1 week |
| 19 | catechol β-naphthol | 50% 50% | No rust in 5 weeks | Rust occurred within 1 week |
| 20 | hydroquinone p-benzoquinone | 50% 50% | No rust in 5 weeks | Rust occurred within 1 week |
| 21 | resorcin anthracene | 50% 50% | No rust in 5 weeks | Rust occurred within 1 week |
| Comparative Example | (Excluding any anti-corrosive agent) | | Rust occurred after 2 weeks | Rust occurred within 1 week |

TABLE 2

| Examples No. | Anti-corrosive agents | Rust occurrence Sample A | Sample B |
|---|---|---|---|
| 1 | benzophenone | No rust in 5 weeks | Rust occurred within 1 week |
| 2 | 4-methylbenzophenone | No rust in 5 weeks | Rust occurred within 1 week |
| 3 | 3-methylbenzophenone | No rust in 5 weeks | Rust occurred within 1 week |
| 4 | 3,4-dimethylbenzophenone | Rust occurred in 5 weeks | Rust occurred within 1 week |
| 5 | 4,4'-dimethylbenzophenone | Rust occurred after 5 weeks | Rust occurred within 1 week |
| 6 | 3,4'-dimethylbenzophenone | Rust occurred after 5 weeks | Rust occurred within 1 week |
| 7 | 4-ethylbenzophenone | No rust in 5 weeks | Rust occurred within 1 week |
| 8 | 4-hydroxybenzophenone | No rust in 5 weeks | Rust occurred within 1 week |
| 9 | 4,4'-dihydroxybenzophenone | No rust in 5 weeks | Rust occurred within 1 week |
| 10 | 2,3,4-trihydroxybenzophenone | No rust in 5 weeks | Rust occurred within 1 week |
| 11 | 2,4-dihydroxybenzophenone | No rust in 5 weeks | Rust occurred within 1 week |
| 12 | 2,2',5,6'-tetrahydro benzophenone | Rust occurred after 5 weeks | Rust occurred within 1 week |
| 13 | 2,3',4,4',6-pentahydroxy benzophenone | Rust occurred after 5 weeks | Rust occurred within 1 week |
| 14 | 4-aminobenzophenone | No rust in 5 weeks | Rust occurred within 1 week |
| 15 | 4,4'-diaminobenzophenone | No rust in 5 weeks | Rust occurred within 1 week |
| 16 | 4-methoxy-2-hydroxybenzophenone | No rust in 5 weeks | Rust occurred within 1 week |
| 17 | 2,2'-dihydroxy-4,4'-dimethoxybenzophenone | No rust in 5 weeks | Rust occurred within 1 week |
| 18 | 2,6-dihydroxy-4-methoxybenzophenone | No rust in 5 weeks | Rust occurred within 1 week |
| 19 | benzophenone 50% hydroquinone 50% | No rust in 5 weeks | Rust occurred within 1 week |
| 20 | benzophenone 50% anthracene 50% | No rust in 5 weeks | Rust occurred within 1 week |
| Comparative Examples | (Excluding any anti-corrosive agent) | Rust occurred after 2 weeks | Rust occurred within 1 week |

TABLE 3

| Examples No. | Anti-corrosive agents | Rust occurrence Sample A | Sample B |
|---|---|---|---|
| 1 | o-cresol | Rust occurred after 5 weeks | Rust occurred within 1 week |
| 2 | m-cresol | Rust occurred after 5 weeks | Rust occurred within 1 week |
| 3 | p-cresol | Rust occurred after 5 weeks | Rust occurred within 1 week |
| 4 | o-ethylphenol | Rust occurred after 5 weeks | Rust occurred within 1 week |
| 5 | m-ethylphenol | No rust in 5 weeks | Rust occurred within 1 week |
| 6 | p-ethylphenol | No rust in 5 weeks | Rust occurred within 1 week |
| 7 | 2,3-dimethylphenol | Rust occurred after 5 weeks | Rust occurred within 1 week |
| 8 | 2,4-dimethylphenol | No rust in 5 weeks | Rust occurred within 1 week |
| 9 | 2,5-dimethylphenol | No rust in 5 weeks | Rust occurred within 1 week |
| 10 | 2,6-dimethylphenol | No rust in 5 weeks | Rust occurred within 1 week |
| 11 | 3,4-dimethylphenol | No rust in 5 weeks | Rust occurred within 1 week |
| 12 | 3,5-dimethylphenol | No rust in 5 weeks | Rust occurred within 1 week |
| 13 | 2,4,6-trimethylphenol | No rust in 5 weeks | Rust occurred within 1 week |
| 14 | 2,4,5-trimethylphenol | Rust occurred after 5 weeks | Rust occurred within 1 week |
| 15 | 5-isopropyl-2-methylphenol | No rust in 5 weeks | Rust occurred within 1 week |
| 16 | 2-isopropyl-5-methylphenol | No rust in 5 weeks | Rust occurred within 1 week |
| 17 | p-tert.-butylphenol | No rust in 5 weeks | Rust occurred within 1 week |
| 18 | 2,6-di-tert.-butyl-p-cresol | No rust in 5 weeks | Rust occurred within 1 week |
| 19 | 4,4'-methylenebis-2,6-di-tert.-butylphenol | No rust in 5 weeks | Rust occurred within 1 week |
| 20 | 2,6-dimethyl-4-tert.-butylphenol | No rust in 5 weeks | Rust occurred within 1 week |
| 21 | 2-tert.-amyl-4-methyl-phenol | No rust in 5 weeks | Rust occurred within 1 week |
| 22 | 2-methyl-4,6-di-tert.-butylphenol | No rust in 5 weeks | Rust occurred within 1 week |
| 23 | 2-methyl-4,6-di-tert.-butylphenol | No rust in 5 weeks | Rust occurred within 1 week |
| 24 | 2,4,6-tri-tert.-butyl-phenol | No rust in 5 weeks | Rust occurred within 1 week |
| 25 | 2,3-dimethylphenol, hydroquinone | No rust in 5 weeks | Rust occurred within 1 week |
| 26 | p-tert-butylphenol β-naphthol | No rust in 5 weeks | Rust occurred within 1 week |
| Comparative Example | (Excluding any anti-corrosive agent) | Rust occurred after 2 weeks | Rust occurred within 1 week |

TABLE 4

| Examples No. | Anti-corrosive agents | | | Rust occurrence Sample A | Rust occurrence Sample B |
|---|---|---|---|---|---|
| 1 | α-naphthol | | | No rust in 5 weeks | Rust occurred within 1 week |
| 2 | β-naphthol | | | No rust in 5 weeks | Rust occurred within 1 week |
| 3 | 1,2-naphthalenediol | | | No rust in 5 weeks | Rust occurred within 1 week |
| 4 | 1,4,5-naphthalenetriol | | | No rust in 5 weeks | Rust occurred within 1 week |
| 5 | 1,2,5,8-naphthalene-tetraol | | | No rust in 5 weeks | Rust occurred within 1 week |
| 6 | 1-chloro-2-naphthol | | | No rust in 5 weeks | Rust occurred within 1 week |
| 7 | 2,4-dichloro-1-naphthol | | | No rust in 5 weeks | Rust occurred within 1 week |
| 8 | 1-nitro-2-naphthol | | | Rust occurred after 5 weeks | Rust occurred within 1 week |
| 9 | 1,6-dinitro-2-naphthol | | | Rust occurred after 5 weeks | Rust occurred within 1 week |
| 10 | 1-nitroso-2-naphthol | | | No rust in 5 weeks | Rust occurred within 1 week |
| 11 | 2-nitroso-1-naphthol | | | No rust in 5 weeks | Rust occurred within 1 week |
| 12 | 1-amino-2-napthol | | | No rust in 5 weeks | Rust occurred within 1 week |
| 13 | { α-naphthol | 50% | | No rust in 5 weeks | Rust occurred within 1 week |
|  | 1-nitro-2-naphthol | 50% | | | |
| 14 | { 1-amino-2-naphthol | 50% | | No rust in 5 weeks | Rust occurred within 1 week |
|  | p-aminophenol | 50% | | | |
| 15 | { α-naphthol | 50% | | No rust in 5 weeks | Rust occurred within 1 week |
|  | anthracene | 50% | | | |
| Comparative Examples | (Excluding any anti-corrosive agent) | | | Rust occurred after 2 weeks | Rust occurred within 1 week |

TABLE 5

| Examples No. | Anti-corrosive agents | Rust occurrence Sample A | Rust occurrence Sample B |
|---|---|---|---|
| 1 | p-benzoquinone | No rust in 5 weeks | Rust occurred within 1 week |
| 2 | o-benzoquinone | No rust in 5 weeks | Rust occurred within 1 week |
| 3 | 1,2-naphthoquinone | No rust in 5 weeks | Rust occurred within 1 week |
| 4 | 1,4-naphthoquinone | No rust in 5 weeks | Rust occurred within 1 week |
| 5 | 2,6-naphthoquinone | No rust in 5 weeks | Rust occurred within 1 week |
| 6 | anthraquinone | No rust in 5 weeks | Rust occurred within 1 week |
| 7 | 9-10-phenanthrenequinone | No rust in 5 weeks | Rust occurred within 1 week |
| 8 | diphenoquinone | No rust in 5 weeks | Rust occurred within 1 week |
| 9 | methyl-p-benzoquinone | Rust occurred after 5 weeks | Rust occurred within 1 week |
| 10 | 2,3-dimethyl-p-benzoquinone | Rust occurred after 5 weeks | Rust occurred within 1 week |
| 11 | 2-methy-1,4-naphthoquinone | No rust in 5 weeks | Rust occurred within 1 week |
| 12 | 2-methylanthraquinone | No rust in 5 weeks | Rust occurred within 1 week |
| 13 | 2,5-dihydroxy-p-benzoquinone | No rust in 5 weeks | Rust occurred within 1 week |
| 14 | tetrahydroxy-p-benzoquinone | No rust in 5 weeks | Rust occurred within 1 week |
| 15 | 5-hydroxy-1,4-naphthoquinone | No rust in 5 weeks | Rust occurred within 1 week |
| 16 | 2,3-dihydroxy-1,4-naphthoquinone | No rust in 5 weeks | Rust occurred within 1 week |
| 17 | 5,8-dihydroxy-1,4-naphthoquinone | No rust in 5 weeks | Rust occurred within 1 week |
| 18 | 2-hydroxyanthraquinone | No rust in 5 | Rust occurred |

TABLE 5-continued

| Examples No. | Anti-corrosive agents | | Rust occurrence Sample A | Sample B |
|---|---|---|---|---|
| 19 | 1,2-dihydroxyanthra-quinone | | No rust in 5 weeks | Rust occurred within 1 week |
| 20 | 1,2,3-trihydroxyanthra-quinone | | No rust in 5 weeks | Rust occurred within 1 week |
| 21 | 1,2,4-trihydroxyanthra-quinone | | No rust in 5 weeks | Rust occurred within 1 week |
| 22 | 1,2,5-trihydroxyanthra-quinone | | No rust in 5 weeks | Rust occurred within 1 week |
| 23 | 1,2,6-trihydroxyanthra-quinone | | No rust in 5 weeks | Rust occurred within 1 week |
| 24 | 1,2,7-trihydroxyanthra-quinone | | No rust in 5 weeks | Rust occurred within 1 week |
| 25 | 2-amino-anthraquinone | | Rust occurred after 5 weeks | Rust occurred within 1 week |
| 26 | 1,2-diaminoanthra-quinone | | No rust in 5 weeks | Rust occurred within 1 week |
| 27 | 1-nitroanthraquinone | | Rust occurred after 4 weeks | Rust occurred within 1 week |
| 28 | 1,5-dinitroanthra-quinone | | Rust occurred after 3 weeks | Rust occurred within 1 week |
| 29 | 2,6-dichloro-p-benzo-quinone | | Rust occurred after 4 weeks | Rust occurred within 1 week |
| 30 | tetrachloro-p-benzo-quinone | | Rust occurred after 4 weeks | Rust occurred within 1 week |
| 31 | tetrabromo-p-benzo-quinone | | Rust occurred after 3 weeks | Rust occurred within 1 week |
| 32 | 2,5-dichloro-3,6-di-hydroxy-p-benzoquinone | | Rust occurred after 5 weeks | Rust occurred within 1 week |
| 33 | 1-methyl-2-hydroxy-p-benzoquinone | | No rust in 5 weeks | Rust occurred within 1 week |
| 34 | 1-methyl-2-hydroxy-1,4-naphthoquinone | | No rust in 5 weeks | Rust occurred within 1 week |
| 35 | 1,2-naphthoquinone 2,3-dihydroxy-1,4-naphthoquinone | (50%) (50%) | No rust in 5 weeks | Rust occurred within 1 week |
| 36 | anthraquinone anthracene | (50%) (50%) | No rust in 5 weeks | Rust occurred within 1 week |
| Comparative Example | (Excluding any anti-corrosive agent) | | Rust occurred after 2 weeks | Rust occurred within 1 week |

TABLE 6

| Examples No. | Anti-corrosive agents | Rust occurrence Sample A | Sample B |
|---|---|---|---|
| 1 | 1-nitroso-2-naphthol | No rust in 5 weeks | Rust occurred within 1 week |
| 2 | 2-nitroso-1-naphthol | No rust in 5 weeks | Rust occurred within 1 week |
| 3 | disodium 1-nitroso-2-naphthol-3,6-disulfonate | Rust occurred after 5 weeks | Rust occurred within 1 week |
| 4 | 4-nitroso-2-methoxy-1-phenol | Rust occurred after 5 weeks | Rust occurred within 1 week |
| 5 | 4-nitroso-2-ethoxy-1-phenol | Rust occurred after 5 weeks | Rust occurred within 1 week |
| 6 | 4-nitrosocarvacrol | Rust occurred after 5 weeks | Rust occurred within 1 week |
| 7 | 6-nitroso-o-cresol | Rust occurred after 5 weeks | Rust occurred within 1 week |
| 8 | 4-nitroso-m-cresol | Rust occurred after 5 weeks | Rust occurred within 1 week |
| 9 | o-nitroso-phenol | No rust in 5 weeks | Rust occurred within 1 week |
| 10 | 2-nitrosoresorcin | No rust in 5 weeks | Rust occurred within 1 week |
| 11 | 4-nitrosoresorcin | No rust in 5 weeks | Rust occurred within 1 week |
| 12 | 2-nitrosoresorcin monomethylether | No rust in 5 weeks | Rust occurred within 1 week |
| 13 | N—nitrosophenyl-hydroxylamine ammonium | Rust occurred after 5 weeks | Rust occurred within 1 week |
| 14 | p-nitrosophenol | Rust occurred after 5 weeks | Rust occurred within 1 week |
| 15 | 2-nitroso-1-naphthol- | Rust occurred | Rust occurred |

TABLE 6-continued

| Examples No. | Anti-corrosive agents | Rust occurrence Sample A | Sample B |
|---|---|---|---|
| 16 | 4-sulfonic acid 5-nitroso-8-quinolinol | Rust occurred after 5 weeks Rust occurred after 5 weeks | within 1 week Rust occurred within 1 week |
| Comparative Example | (Excluding any anti-corrosive agent) | Rust occurred after 2 weeks | Rust occurred within 1 week |

EXAMPLE 2

A 10 μm thick polyester film having wave form rough projections with a surface roughness $R_{max}=$ about 300 was run along a cylindrical can in a vacuum of $5\times 10^{-5}$ Torr into which oxygen was introduced at the rate of 0.3 l/min and subjected to continuous oblique deposition. The oblique deposition was conducted by depositing a CoNi alloy having an Ni content of 20% by weight and fused by means of electron beam heating with the alloy of an incident angle of 30° or less being cut off, so as to form an oxygen-containing CoNi thin ferromagnetic layer having a thickness of 1,000 Å. This will be termed Sample A.

Another sample was prepared under similar conditions except that the vacuum was at $5\times 10^{-6}$ Torr and the deposition was conducted without the introduction of oxygen, to form a CoNi thin ferromagnetic layer containing no oxygen. This sample will be referred to as Sample B.

From measurement of the amount of oxygen in the coating by means of the Auger electron spectrometry analysis, it was found that the average amount of oxygen in the coating of Sample A was 10% as an amount ratio of oxygen to the sum of Co and Ni (Oxygen/(CO+Ni)×100) whereas the amount of oxygen in the coating of Sample B was less than 1%.

Coated onto the surface of these samples were solutions of various anti-corrosive agents in water, alcohol, acetone, ethyl acetate, toluene or the like, and the adsorbed layer of the anti-corrosive agent was formed on the sample surface by washing the sample with the solvent used and drying. A lubricant layer was formed on the adsorbed anti-corrosive agent layer by coating and drying a dilution of each of various lubricants in a solvent. In instances where no appropriate solvent was found, the sample was heated in a vacuum, atmosphere or inert gases to expose the sample surface to a lubricant vapor and form the lubricant layer. In each case, the thickness of the lubricant layer was prepared to be within the range of 10 to 100 mg/m².

The sample was then slit into a desired width to produce a magnetic tape which was in turn placed in an atmosphere of 50° C. and 90% relative humidity. Sample A was measured every 3 days to determine the degree of clogging of a magnetic head by conducting recording and reproduction with a video deck. At the same time, microscopic observations of the surface of the magnetic layer were carried out to determine the degree of rust occurrence. Sample B was tested daily in substantially the same manner. The results are shown in Table 7 which follows.

TABLE 7

| No.;Comparative Examples in parentheses | Class of samples | Anti-corrosive agents | Lubricant | Day of rust occurrence | Day of occurrence of clogging |
|---|---|---|---|---|---|
| 1 | B | dinonyl naphthalene sulfonate | stearic acid amide | 4th day | 3rd day |
| (2) | B | — | — | 1st day | 1st day |
| (3) | B | — | stearic acid amide | 2nd day | 1st day |
| 4 | B | dicyclohexyl ammonium nitrite | stearic acid amide | 5th day | 4th day |
| (5) | B | dicyclohexyl ammonium nitrite | — | 6th day | 1st day |
| 6 | A | 2-tert.-butyl-catechol | Ni stearate | Not occurred in 30 days | 15th day |
| (7) | A | — | Ni stearate | 15th day | 6th day |
| (8) | A | 2-tert.-butyl-catechol | — | Not occurred in 30 days | 3rd day |
| 9 | A | 4,4'-diamino-benzophenone | stearic acid amide | 21th day | 15th day |
| (10) | A | — | — | 12th day | 6th day |
| 11 | A | 1,2-naphthalene diol | n-tridecane | Not occurred in 30 days | 15th day |
| (12) | A | — | n-tridecane | Not occurred in 15 days | 9th day |
| 13 | A | 2-amino-l-naphthol | cetylalcohol | 30th day | 21th day |
| 14 | A | 2-amino-l-naphthol | n-tridecane | 30th day | 30th day |
| 15 | A | 2-amino-l-naphthol | cleic acid | 30th day | 24th day |
| 16 | A | 2-amino-l-naphthol | Ni perfluroalkyl sulfonate | 30th day | 24th day |

TABLE 7-continued

| No.;Comparative Examples in parentheses | Class of samples | Anti-corrosive agents | Lubricant | Day of rust occurrence | Day of occurrence of clogging |
|---|---|---|---|---|---|
| 17 | A | 2-amino-1-naphthol/2-nitroso-resorcin (1:1) | Ni perfluoroalkyl sulfonate | Not occurred in 30 days | 30th day |
| 18 | A | 2-amino-1-naphthol/2-nitroso-resorcin (1:1) | polydimethylsiloxane/ stearic acid amide (1:1) | Not occurred in 30 days | 27th day |
| 19 | A | α-benzoin-oxime | polydimethylsiloxane | 30th day | 21th day |
| 20 | A | 1,2-naphthoquinone | polydimethylsiloxane | 30th day | 27th day |

EXAMPLE 3

Using Sample A and Sample B obtained in Example 2, a solution of each of various anti-corrosive agents in a solvent such as ethyl alcohol, acetone, ethyl acetate, toluene or the like was coated onto the surface of the sample and the coating was dried to form an adsorbed layer of the anti-corrosive agent. The amount of the coating was adjusted to be about 10 mg/m². Coated on the back surface of the polyester film was a solution of a lubricant in said solvent, and the coating was dried to form the lubricant layer. The amount of coating of the lubricant was in the range of 10 to 100 mg/m². After the sample was wound in a roll and maintained at 30° C. for 10 hours, it was slit into a desired width to give a magnetic tape sample. This tape sample was then placed in an atmosphere of 50° C. and 90% relative humidity. Sample A was measured every 3 days to determine the occurrence of clogging by subjecting the tape sample to recording and reproduction with a video deck. Sample B was measured likewise daily. At the same time, both samples were measured microscopically to determine the degree of rust occurrence. The results are shown in Table 8 which follows.

TABLE 8

| No.;Comparative Examples in parentheses | Class of samples | Anti-corrosive agents | Lubricant | Day of rust occurrence | Day of occurrence of clogging |
|---|---|---|---|---|---|
| 1 | B | dinonyl naphthalenesulfonate | stearic acid amide | 5th day | 3rd day |
| 2 | B | dinonyl naphthalenesulfonate | polydimethyl siloxane | 5th day | 2nd day |
| (3) | B | — | polydimethyl siloxane | 1st day | 1st day |
| 4 | B | dicyclohexyl ammonium nitrite | stearic acid amide | 6th day | 3rd day |
| (5) | B | dicyclohexyl ammonium nitrite | stearic acid amide | 6th day | 1st day |
| 6 | A | 2-tert.-butyl-catechol | nickel stearate | Not occurred in 30 days | 15th day |
| (7) | A | — | nickel stearate | 15th day | 5th day |
| (8) | A | 2-tert.-butyl-catechol | — | Not occurred in 30 days | 3rd day |
| 9 | A | 4,4'-diaminobenzophenone | stearic acid amide | 30th day | 12th day |
| 10 | A | 1,2-naphthalene diol | n-tridecane | Not occurred in 30 days | 15th day |
| 11 | A | 2-amino-1-naphthol | cetylalcohol | 30th day | 15th day |
| 12 | A | 2-amino-1-naphthol | n-tridecane | Not occurred in 30 days | 30th day |
| 13 | A | 2-amino-1-naphthol | oleic acid | Not occurred in 30 days | 30th day |
| 14 | A | 2-amino-1-naphthol | Ni perfluoroalkyl sulfonate | Not occurred in 30 days | 30th day |
| 15 | A | 2-amino-1-naphthol/2-nitrosoresorcin (1:1) | Ni perfluoroalkyl sulfonate | Not occurred in 30 days | Not occurred in 30 days |
| 16 | A | 2-amino-1-naphthol/2-nitrosoresorcin (1:1) | polydimethylsiloxane stearic acid amide (1:1) | Not occurred in 30 days | Not occurred in 30 days |
| 17 | A | α-benzoinoxime | polydimethyl siloxane | 30th day | 15th day |
| 18 | A | 1,2-naptho- | polydimeth- | Not occurred | 30th day |

TABLE 8-continued

| No.;Comparative Examples in parentheses | Class of samples | Anti-corrosive agents | Lubricant | Day of rust occurrence | Day of occurrence of clogging |
|---|---|---|---|---|---|
| | | quinone | yl siloxane | in 30 days | |

Although each of the above examples relates to the CoNi-series magnetic layer, Co thin layers, Fe-Ni thin layers, Fe-Co thin layers and so on produced similar results. It is to be noted that thin ferromagnetic layers containing oxygen receive greater effects than thin layers containing no oxygen, this tendency being significant for an oxygen content ranging from 3 to 45%.

EFFECT OF THE INVENTION

As has been apparent from the previous description of the specification, the magnetic recording medium according to the present invention has overall durability, including corrosion resistance and travel performance, and no clogging tendency, so that it has great practical advantage.

What is claimed is:

1. A magnetic recording medium having an oxygen-containing thin ferromagnetic metal layer formed on a nonmagnetic substrate, wherein at least one compound, capable of suppressing hydration of ferromagnetic metal ions by acting upon the ionized ferromagnetic metal, selected from the group consisting of dihydric phenols, diaryl ketones, alkyl phenols, naphthols, quinones, nitroso compounds and oxime compounds is introduced on or around said thin ferromagnetic metal layer.

2. A magnetic recording medium according to claim 1 wherein said compound is a member selected from the group consisting of hydroquinone, resorcin, catechol, 2-methylhydroquinone, 4-methylresorcinol, 5methylresorcinol, 4-methylpyrocatechol, 2,5-dimethylhydroquinone, 4,6-dimethylresorcinol, 2,5-dimethylresorcinol, 2-isopropyl-5-methylhydroquinone, 2-tert.-butylhydroquinone, 2,5-di-tert.-butylhydroquinone, 4-tert.-butylcatechol, 2-aminoresorcinol, 2-nitroresorcinol, 2,5-dichlorohydroquinone, benzophenone, 4-methylbenzophenone, 3-methylbenzophenone, 3,4-dimethylbenzophenone, 4,4'-dimethylbenzophenone, 3,4'-dimethylbenzophenone, 4-ethylbenzophenone, 4-hydroxybenzophenone, 4,4'-dihydroxybenzophenone, 2,3,4-trihydroxybenzophenone, 2,4-dihydroxybenzophenone, 2,2',5,6'-tetrahydroxybenzophenone, 2,3',4,4',6-pentahydroxybenzophenone, 4-aminobenzophenone, 4,4'-diaminobenzophenone, 4-methoxy-2-hydroxybenzophenone, 2,2'-dihydroxy-4,4'-dimethoxybenzophenone, 2,6-dihydroxy-4-methoxybenzophenone, o-cresol, m-cresol, p-cresol, o-ethylphenol, m-ethylphenol, p-ethylphenol, 2,3-dimethylphenol, 2,5-dimethylphenol, 2,6-dimethylphenol, 3,4-dimethylphenol, 3,5-dimethylphenol, 2,4,6-trimethylphenol, 2,4,5-trimethylphenol, 5-isopropyl-2-methylphenol, 2-isopropyl-5-methylphenol, p-tert.-butylphenol, 2,6-di-tert.-butyl-p-cresol, 4,4'-methylenebis-2,6-di-tert.-butylphenol, 2,6-dimethyl-4-tert.-butylphenol, 2-tert.-amyl-4-methylphenol, 2-methyl-4,6-di-tert.-butylphenol, 2,4,6-tri-tert.-butylphenol, α-naphthol, β-naphthol, 1,2-naphthalenediol, 1,4,5-naphthalenetriol, 1,2,5,8-naphthalenetetraol, 1-chloro-2-naphthol, 2,4-dichloro-1-naphthol, 1-nitro-2-naphthol, 1,6-dinitro-2-naphthol, 1-nitroso-2-naphthol, 2-nitroso-1-naphthol, 1-amino-2-naphthol, p-benzoquinone, o-benzoquinone, 1,2-naphthoquinone, 1,4-naphthoquinone, 2,6-naphthoquinone, anthraquinone, 9,10-phenanthrenequinone, diphenoquinone, methyl-p-benzoquinone, 2,3-dimethyl-p-benzoquinone, 2-methyl-1,4-naphthoquinone, 2-methylanthraquinone, 2,5-dihydroxy-p-benzoquinone, tetrahydroxy-p-benzoquinone, 5-hydroxy-1,4-naphthoquinone, 2,3-dihydroxy-1,4-naphthoquinone, 5,8-dihydroxy-1,4-naphthoquinone, 2-hydroxyanthraquinone, 1,2-dihydroxyanthraquinone, 1,2,3-trihydroxyanthraquinone, 1,2,4-trihydroxyanthraquinone, 1,2,5-trihydroxyanthraquinone, 1,2,6-trihydroxyanthraquinone, 1,2,7-trihydroxyanthraquinone, 2-aminoanthraquinone, 1,2-diaminoanthraquinone, 1-nitroanthraquinone, 1,5-dinitroanthraquinone, 2,6-dichloro-p-benzoquinone, tetrachloro-p-benzoquinone, tetrafluoro-p-benzoquinone, 2,5-dichloro-3,6-dihydroxy-p-benzoquinone, 1-methyl-2-hydroxy-1,4-naphthoquinone, 1-nitroso-2-naphthol, 2-nitroso-1-naphthol, 1-nitroso-2-naphthol-3,6-disulphonic acid sodium salt, 4-nitroso-2-methoxy-1-phenol, 4-nitroso-2-ethoxy-1-phenol, 4-nitrosocarvacrol, 6-nitroso-o-cresol, 4-nitroso-m-cresol, o-nitrosophenol, 2-nitrosocresorcin, 4-nitrosoresorcin, 2-nitrosoresorcin monomethylether, N-nitrosophenyl hydroxylamine ammonium salt, p-nitrosophenol, 2-nitroso-1-naphthol-4-sulphonic acid, 5-nitroso-8-quinolinol, benzyloxime, glyoxime, benzaldoxime, benzamidoxime, α-benzoinoxime, acetophenone oxime, benzophenone oxime, dimethylglyoxime, salicylaldoxime, 2,4-dimethyl phenol, tetrabromo-p-benzoquinone and 1-methyl-2-hydroxy-p-benzoquinone.

3. A magnetic recording medium according to claim 1, characterized in that a thin layer of said compound is formed on a surface of said thin ferromagnetic metal layer.

4. A magnetic recording medium according to claim 1, characterized in that said compound is present at least on a surface of said nonmagnetic substrate on which said thin ferromagnetic metal layer is formed.

5. A magnetic recording medium according to claim 1 wherein said compound is present in an amount between about 0.5 and 500 mg per square meter of said medium.

6. A magnetic recording medium having an oxygen-containing thin ferromagnetic metal layer formed on a nonmagnetic substrate wherein at least one compound capable of suppressing hydration of ferromagnetic metal ions upon ionization of a ferromagnetic metal selected from the group consisting of dihydric phenols, diaryl ketones, alkyl phenols, naphthols, quinones, nitroso compounds and oxime compounds is introduced on or around said thin ferromagnetic metal layer, and a lubricant is applied onto said thin ferromagnetic metal layer.

7. A magnetic recording medium according to claim 6 wherein said lubricant is present in an amount between 0.5 and 500 mg per square meter of said medium.

8. A magnetic recording medium according to claim 7 wherein said amount is between 5 and 200 mg per square meter of said medium.

9. A magnetic recording medium having an oxygen-containing thin ferromagnetic metal layer formed on a nonmagnetic substrate wherein said thin ferromagnetic metal layer having introduced on or around it a compound capable of suppressing hydration of ferromagnetic metal ions, by acting upon the ionized ferromagnetic metal, selected from the group consisting of dihydric phenols, diaryl ketones, alkyl phenols, naphthols, quinones, nitroso compounds and oxime compounds is formed on one surface of said non-magnetic substrate which is flexible and elongated and a lubricant-containing layer is formed on the other surface thereof.

10. A magnetic recording medium according to claim 9 wherein said lubricant is present in an amount between 0.5 and 500 mg per square meter of said medium.

* * * * *